United States Patent [19]
Welton et al.

[11] 3,740,946
[45] June 26, 1973

[54] MOMENTUM EXCHANGE THROTTLING INJECTOR

[75] Inventors: Donald E. Welton, Calabasas; John R. Hiland, Canoga Park, both of Calif.

[73] Assignee: North American Rockwell Corporation, Los Angeles, Calif.

[22] Filed: Feb. 7, 1963

[21] Appl. No.: 258,373

[52] U.S. Cl. .................................. 60/204, 60/258
[51] Int. Cl. ............................................ F02k 9/02
[58] Field of Search ................ 60/35.6, 39.74, 258, 60/39.74 A, 204

[56] References Cited
UNITED STATES PATENTS

| | | | |
|---|---|---|---|
| 2,590,853 | 4/1952 | Fulton | 60/39.28 |
| 2,616,254 | 11/1952 | Mock | 60/39.28 |
| 2,617,478 | 11/1952 | Hildestad | 60/39.28 |
| 2,724,239 | 11/1955 | Fox | 60/39.28 |
| 2,975,592 | 3/1961 | Fox | 60/257 |
| 3,117,417 | 1/1964 | Rutkowski, Jr. | 60/240 |

Primary Examiner—Samuel Feinberg
Attorney—William R. Lane and Thomas S. MacDonald

[57] ABSTRACT

This invention relates to liquid rocket engines. More particularly, this invention relates to a throttling injector for varying propellant flow rates and consequently liquid rocket engine thrust levels over wide ranges.

2 Claims, 3 Drawing Figures

PATENTED JUN 26 1973
3,740,946
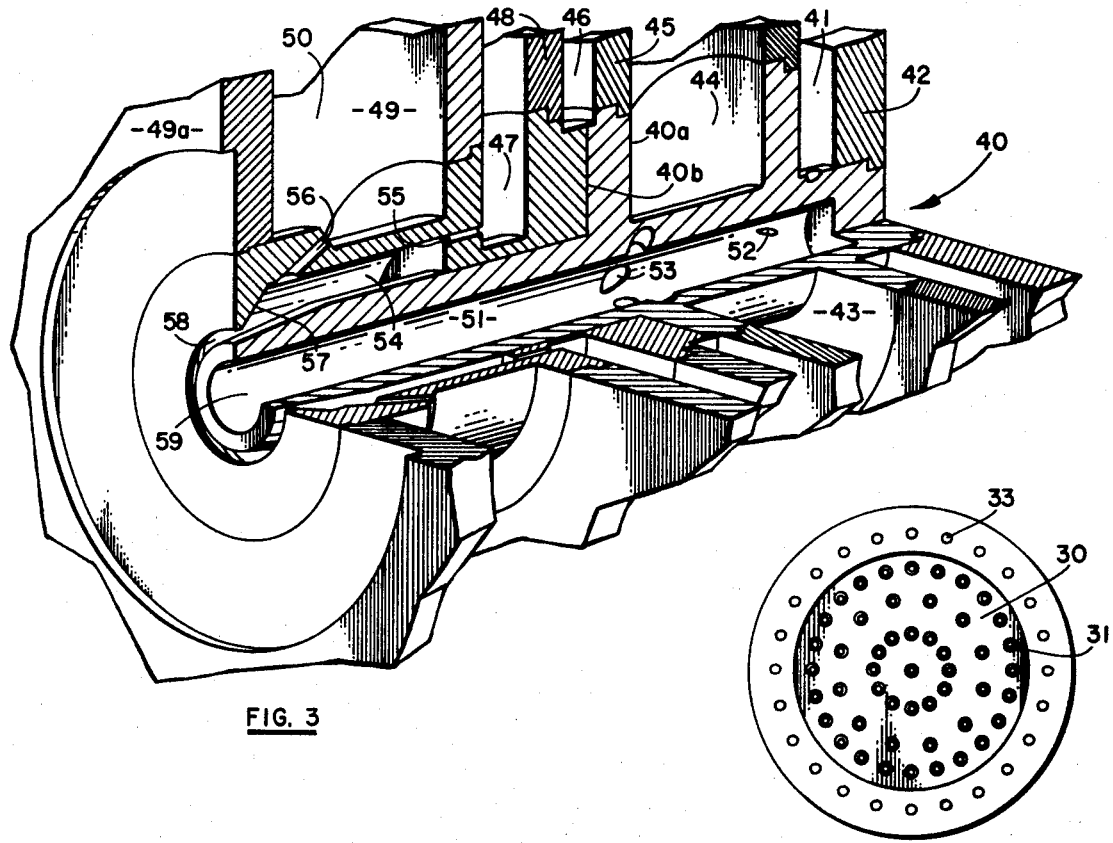
FIG. 3
FIG. 2
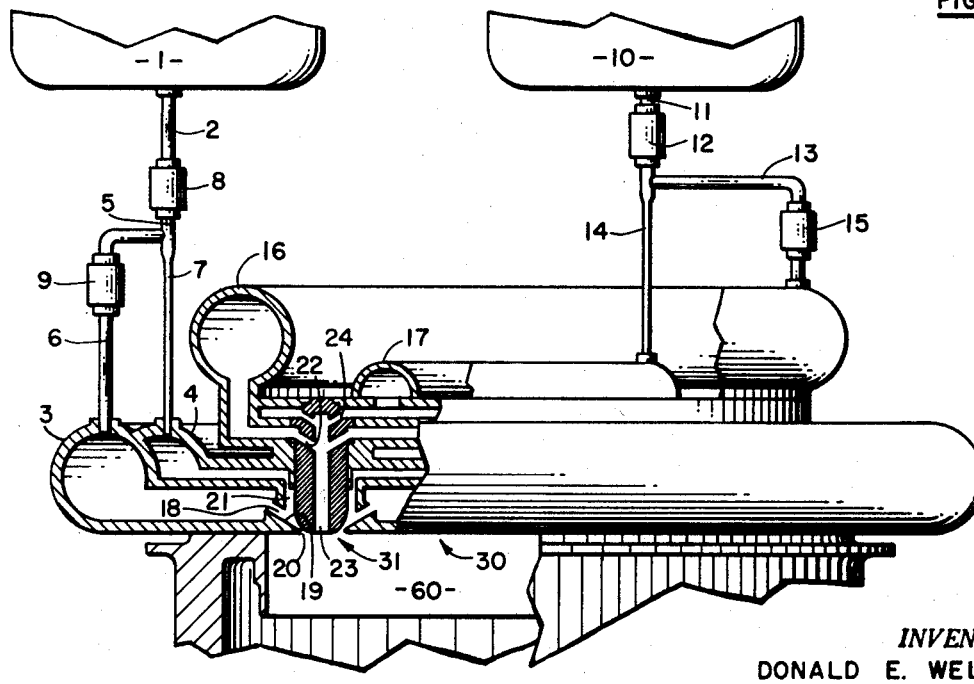
FIG. 1
INVENTORS
DONALD E. WELTON
BY JOHN R. HILAND
Donald W. Graves
ATTORNEY

MOMENTUM EXCHANGE THROTTLING INJECTOR

In prior art devices, satisfactory control has proved difficult because of the unique problems encountered in rocket design. Examples include high temperature ranges, space and weight limitations, pressure drops, and consequently injection velocities, mechanical complexities and reliability, and the need for accurate control.

Solutions to these problems have been submitted which in the past have not been completely effective due to complexity or other factors.

The instant device represents a solution whereby means are provided to vary propellant flow rate over wide ranges while maintaining reasonable propellant injection velocities, low constant inlet pressures and accurate oxidizer-to-fuel ratio control. This throttling concept contains no moving parts within the injector body and is scalable to large engine sizes.

Briefly, the throttling structure comprises a source of propellant having a plurality of conduits leading to a plurality of manifolds from which the propellant is injected into the combustion chamber through injector elements. One of the conduits has associated therewith a throttling valve which can vary the flow through the conduit and hence to the manifold over a wide range. At full thrust levels, the throttling valve is opened fully and flow through the two conduits into the respective manifolds is fed to the injector from which the fuel passes into the combustion chamber. As the throttling valve in one conduit is employed, the flow through that conduit is decreased while at the same time the flow in the other conduit increases to maintain an adequate pressure drop across the injector. Thus, even at low flow rates, adequate pressure drop is maintained.

Accordingly it is an object of this invention to provide for an improved throttling device.

It is another object of this invention to provide a momentum exchange throttling injector for varying propellant flow rate and liquid rocket engine thrust levels over wide ranges.

It is a more particular object of this invention to provide a momentum exchange throttling injector to vary propellant flow rate and consequently liquid rocket engine thrust levels over wide ranges while maintaining reasonable propellant injection velocities, low constant inlet pressures and accurate oxidizer-to-fuel ratio control.

It is another object of this invention to provide an injector for rocket engines or the like in which fluid is injected by means of a momentum exchange between more than one inlet means.

It is another object of this invention to provide an injector for rocket engines and the like in which fluid is injected by means of a momentum exchange between more than one inlet means in combination with injection of an inert gas to maintain injection velocities.

Other objects and features of the present invention will become apparent in view of the following description considered in connection with the accompanying drawings in which:

FIG. 1 is a schematic view partially in cross-section of an injection system incorporating features of the instant invention, FIG. 2 is a plan view of a typical injector face, and FIG. 3 is a cross-sectional view of an injector element.

It is sometimes desirable in the employment of rocket engines to vary the thrust and therefor acceleration of the vehicle. In the past this has been accomplished in a variety of ways. The simplest method perhaps has been to provide a throttling valve between the pressurized propellant tank and the injector. However, this method is limited to throttling ranges of 3:1 or 4:1 which is the ratio of maximum thrust to minimum thrust due to the rapid degradation in the combustion efficiency which occurs beyond these throttling ranges. In wider applications of rocket engines, the attendant need for throttling ratios is in a range of 4:1 or greater. Accordingly, the above method has proved unsatisfactory.

The reason why a simple throttling valve between the pressurized propellant tanks and the injector has proved unsatisfactory is because of pressure drop across the valve. For proper mixing of propellant it is necessary that a pressure drop across the injector face of a minimum amount be maintained. Typically, this is in the neighborhood of 30 to 40 psia. In a simple throttling valve, the pressure drop occurs across the valve itself. Accordingly, for throttling ranges greater than 4:1 a pressure drop across the injector face falls below the minimum amount resulting in unsatisfactory injection and hence lowered efficiency. This pressure drop is necessary because a certain velocity has to be imparted to the propellants for proper atomization and mixing.

Another approach to the problem has been to vary the pressure in the propellant tanks. This has likewise proved unsatisfactory because of problems inherent in pressure control such as the need for complex pressure regulators.

For some applications a satisfactory solution is described in U. S. Pat. application Ser. No. 166,452, now U.S. Pat. No. 3,234,731, assigned to the assignee of this application. In that application is described a variable thrust device and injector in which an annular movable member in the injector itself controls thrust levels over wide ranges.

However, such a construction while satisfactory for many applications has its disadvantages. One disadvantage lies in the need for moving parts in the injector. This is undesirable due to high temperatures. Also, while satisfactory for small engines such as a 1,000 lb. thrust size, larger applications in the neighborhood of 20,000 lb. thrust are less advantageous because of the masses involved and the attendant large forces necessary to vary the poppet position. Finally, since fuel and oxidizer are injected in an annular direction, good mixture of propellants and hence efficient combustion is obviated at those areas of the injector face not adjacent to the actual introduction area.

The instant invention provides a simple and satisfactory solution to many of the problems encountered in many of the previously described valves.

The invention utilizes the principle of a momentum exchange to provide a means of varying propellant flow and consequently liquid rocket engine thrust levels over wide ranges for maintaining reasonable propellant injection velocities, low injector inlet pressures and accurate oxidizer to fuel ratio control. Momentum exchange between the propellants occurs when the fluid flow through one conduit is reduced. As a result, the velocity of the propellant through the other conduit is increased, i.e., inversely varies. The structure uses no moving parts within the injector body and is scalable to very large engine sizes.

The invention is schematically shown in FIG. 1. This embodiment is particularly applicable to a bipropellant system and for simplicity is described with reference to a liquid nitrogen tetroxide and a 50—50 by weight mixture of unsymmetrical dimethylhydrazine and hydrazine system.

A fuel tank 1 contains, for example, liquid propellant under pressure. This pressure may be for example 380 psia and is maintained in a conventional manner such as by gas pressure. The invention is also applicable to pump fed systems where pump discharge pressures would be 380 psia for this example.

This fuel is fed through conduit 2 to two fuel manifolds 3 and 4 by means of conduits 6 and 7 which branch off at point 5 which may be termed a split connection in the conduit 2. Depending on the proportion of flow desired through conduits 6 and 7, the flow areas are accordingly sized. For example, at maximum thrust levels, a large portion of the fuel (approximately 96 percent) travels through conduits 6 while the remainder (approximately 4 percent) travels through conduit 7. While a 96%—4% split is described, it is within the scope of this invention to utilize other percentages. For example, the range may vary from a 50%—50% to 99%—1%. That is, the ratio of the cross-sectional area of lines 7 and 14 to lines 6 and 13 respectively may be in the range of 1:1 to 1:99. 8 is an on-off valve to shut off all flow during shutdown. 9 represents a throttling valve of conventional construction to vary the flow through line 6 from 0 to 100 percent of the maximum flow through line 6 (96 percent of total flow through line 2).

Similar in all respects to the fuel delivery system is the oxidizer delivery system. Thus, 10 is a pressurized tank containing an oxidizer such as liquid oxygen. This oxidizer is fed into line 11, on-off valve 12 and split into large line 13 and small line 14. Again, approximately 96 percent of the oxidizer flows through line 13 at maximum flow and approximately 4 percent through line 14 at maximum flow. Throttling valve 15 is similar to valve 9. Manifold 16 is fed by line 13 and manifold 17 by line 14.

An injector element is indicated generally as 31. For simplicity, only one such element is shown in FIG. 1 although any number of such elements may be utilized. This element is shown in detail in FIG. 3. 30 is the injector face which forms one surface of a combustion chamber. Although not shown, a conventional nozzle is provided as part of the rocket engine. Since it is old and well known in the prior art to utilize an injector and nozzle, only the new and improved injector combination is shown.

Referring to FIG. 2, a plurality of elements 31 are provided in the injector face. The number, positioning and location of these injector elements will vary with any particular application and therefore does not form a part of this invention.

Referring again to FIG. 1, in operation at full thrust levels, fuel from manifold 3 passes through passage 18, impinges on splash lip 19 and is discharged to annular opening 20. Likewise, fuel from manifold 4 exits through passage 21, impinges on splash lip 19, and is discharged through annular opening 20 into combustion chamber 60.

Oxidizer from manifold 16 in like manner enters opening 22 and leaves through center opening 23 to mix with the fuel. Oxidizer from manifold 17 passes through opening 24 and likewise mixes with the fuel after discharge from opening 23. Injector pressure drops for all manifolds is set at approximately 60 psia for this condition. Thus, at tank pressures of 380 psia and a combustion chamber pressure of 300 psia, 20 psia represents the pressure drop through the system and 60 psia, the pressure drop across the injector face. The values for injector pressure drops, tank pressures, chamber pressure, valve and line pressure drops are only example values which are given for system description purposes. These values may vary greatly from those presented herein for any particular application without distracting from the scope of the invention.

Throttling is effected by simultaneously decreasing the flow areas of both throttling valves 9 and 15. These valves may be sized to provide constant mixture ratio control through simultaneous operation or may be operated independently. As flow is decreased to large manifolds 3 and 16, the flow is increased to the small manifolds 4 and 17 because of an increase in injector pressure drop caused primarily by a drop in combustion chamber pressure.

For example, at a 10:1 throttling condition, flow through the large manifolds can be 1 percent of the maximum flow at an injector pressure drop of less than 1 psia. The remaining pressure drop occurs across valves 9 and 15. The flow through the small manifolds can be 9 percent of maximum flow at an injector pressure drop approaching 350 psia. This is assuming a combustion chamber pressure of 30 psia and a propellant tank pressure of 380 psia.

Throttling in this manner results in a continuous momentum exchange between the propellant flowing from the large and small manifolds. Approximate effective velocity of the propellants entering the combustion chamber can be determined by the following relationship:

$$Veff = (M_1 V_1 + M_2 V_2)/(M_1 + M_2)$$

where
$M_1$ = large manifold mass flow rate
$M_2$ = small manifold mass flow rate
$V_1$ = large manifold injection velocity
$V_2$ = small manifold injection velocity
$Veff$ = effective velocity of the propellant entering the combustion chamber.

FIG. 2 illustrates how the injection elements are positioned in an injector face. 30 represents the injector face while 31 illustrates the injector elements. Areas 33 represent bolt holes provided for attachment to the nozzle, thrust chamber or other structure.

FIG. 3 illustrates in more detail one mode of an assembly of an injector element. The injector element indicated generally at 40 while shown as being comprised of two pieces 40a and 40b, can, of course, be an integral portion. Area 41 bounded by plates 42 and 43 is one of the oxidizer manifolds. Area 44 bounded by plates 43 and 45 is another oxidizer manifold. 46 is a space between plates of an oxidizer manifold and the fuel manifolds and acts as an additional barrier between the fuel and oxidizer manifolds. Fuel manifold 47 bounded by plates 48 and 49 constitutes one of the fuel manifolds. 50 is another fuel manifold bounded by plates 49 and 49a. Oxidizer from manifold 41 is injected into chamber 51 through apertures 52. Likewise, oxidizer from manifold 44 is injected into chamber 51 through apertures 53. Fuel from manifold 47 enters annular chamber 54 through apertures 55. In similar manner, fuel from manifold 50 enter annular chamber 54 through apertures 56. The fuel impinges on splash lip 57 and discharges from the injector into the combustion chamber through annular aperture 58 in the form of a hollow cone spray. Oxidizer in chamber 51 passes axially therethrough and out opening 59 to mix with the fuel. Apertures 53 and 52 are bored so that the oxidizers enter tangentially to 51 and at an angle to the centerline of the opening in order to impart a swirling velocity to the oxidizer. The oxidizer therefore discharges from the injector face in the form of a swirling, diverging hollow cone spray. This helps to impart a thorough mixing of the oxidizer and fuel as they enter the combustion chamber. As an example of one injector element constructed according to this invention, apertures 52 are three in number and have a diameter of 0.025 inches. There are six apertures 53 at a diameter of 0.089 inches. There are five apertures 55 at a diameter of 0.0156 inches and 25 apertures 56 at a diameter of 0.035 inches. Annular chamber 51 has a diameter of 0.3 inches.

It is within the scope of this invention to provide for additional throttling capability. This is accomplished by injecting an inert gas such as helium into the lines 7 and 14 at very low throttling ranges. This would be done in a manner similar to that shown in U.S. application Ser. No. 242,240, now U.S. Pat. No. 3,453,827, assigned to the assignee of this application, which application is hereby incorporated by reference. Thus, lines 7 and 14 would also have throttling valves. When valves 9 and 15 are used to throttle the system to minimum thrust, such throttling valves (not shown) in lines 7 and 14 can further decrease flow rates while helium is injected into the manifolds 4 and 17 to increase or maintain sufficient injection velocities. This is done in the manner described in application Ser. No. 242,240.

While the preceding description has been made with reference to a bipropellant system, it is apparent that this throttling concept is equally applicable to a monopropellant system. In such a system, it would require only that one assembly of manifolds, tank, valve, and injectors be provided for. In other words, approximately half of the system shown in FIG. 1 would be necessary.

It is further apparent that any number of propellants may be controlled by providing an appropriate number of distribution systems utilizing this concept.

Also within the scope of this invention is to provide for more than two branched conduits leading from a common tank. Thus, instead of two injection portions for each fuel, a greater number may be employed for even further thrust control.

Also within the scope of this invention are such uses as thrust chambers, gas generators, nuclear applications, metering valves, and similar systems. Other applications include internal combustion engines where the fuel and gas delivery is achieved using the principles of this invention.

As many different embodiments of this invention may be made, without departing from the spirit and scope thereof, it is understood that the invention is not limited except as defined in the claims.

We claim:

1. A variable thrust producing device comprising
   a combustion chamber; a source of propellant under pressure; a plurality of conduit means supplied by said source,
   at least one of said conduit means having throttling means to vary flow of propellant through said one conduit means;
   injector means adapted to be supplied with propellant from said plurality of conduit means, said injector means being adapted to inject propellant received from said conduit means into said combustion chamber;
   means to supply an inert gas under pressure to said remaining conduit means so as to increase the velocity of propellant injected into said combustion chamber;
   whereby, when said throttling means is actuated to reduce the flow through said one conduit means, the velocity of propellant through said remaining conduit means is increased.

2. The method of lowering the thrust of a thrust producing device which comprises;
   providing a plurality of lines of communication between a source or propellant under pressure,
   injecting said propellant into said combustion chamber so as to produce a pre-determined combustion chamber pressure,
   reducing the rate of propellant flow through at least one of said lines of communication to lower the combustion chamber pressure whereby the velocity of propellant through the remaining lines of communication is increased,
   and further supplying an inert gas under pressure to said remaining lines of communication so as to further increase the velocity of propellant injected into said combustion chamber.

* * * * *